United States Patent
Mansouri Rad et al.

(10) Patent No.: US 11,119,342 B2
(45) Date of Patent: Sep. 14, 2021

(54) OPTICAL DEVICE

(71) Applicants: Mohammad Mehdi Mansouri Rad, Kanata (CA); Hamid Ebrahimzad, Ottawa (CA)

(72) Inventors: Mohammad Mehdi Mansouri Rad, Kanata (CA); Hamid Ebrahimzad, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/791,774

(22) Filed: Feb. 14, 2020

(65) Prior Publication Data

US 2021/0255393 A1 Aug. 19, 2021

(51) Int. Cl.
| | |
|---|---|
| *G02F 1/01* | (2006.01) |
| *G02B 6/293* | (2006.01) |
| *H04B 10/50* | (2013.01) |
| *G02B 6/12* | (2006.01) |
| *G02B 6/42* | (2006.01) |
| *H04B 10/572* | (2013.01) |

(52) U.S. Cl.
CPC .......... *G02F 1/011* (2013.01); *G02B 6/29338* (2013.01); *G02B 6/29395* (2013.01); *H04B 10/5057* (2013.01); *H04B 10/5059* (2013.01); *G02B 6/4266* (2013.01); *G02B 2006/12061* (2013.01); *H04B 10/572* (2013.01)

(58) Field of Classification Search
None
See application file for complete search history.

(56) References Cited

U.S. PATENT DOCUMENTS

| | | | | |
|---|---|---|---|---|
| 9,467,233 | B1 * | 10/2016 | Lentine | H04B 10/564 |
| 9,780,870 | B1 * | 10/2017 | Zortman | H04B 10/5057 |
| 10,516,503 | B1 | 12/2019 | Millar et al. | |
| 2010/0200733 | A1 * | 8/2010 | McLaren | G02F 1/025 250/214 C |
| 2015/0160482 | A1 * | 6/2015 | Amberg | G02F 1/0147 385/1 |
| 2017/0010485 | A1 * | 1/2017 | Amberg | G02F 1/025 |
| 2018/0115136 | A1 | 4/2018 | Delfyett et al. | |

FOREIGN PATENT DOCUMENTS

| | | |
|---|---|---|
| CN | 110346874 A | 10/2019 |
| WO | 2020023496 A1 | 1/2020 |

OTHER PUBLICATIONS

Tsuyoshi Yoshida et al "Technologies toward Implementation of Probabilistic Constellation Shaping"; ECOC 2018.
Chen Sun et al "A 45 nm CMOS-SOI Monolithic Photonics Platform With Bit-Statistics-Based Resonant Microring Thermal Tuning"; IEEE Journal of Solid-State Circuits, vol. 51, No. 4, Apr. 2016.
Yankov, Metodi Plamenov et al "Constellation Shaping for WDM systems using 256QAM/1024QAM with Probabilistic Optimization"; Journal of Lightwave Technology, 34(22), 5146-5156, 2016.
Junho Cho et al "Probabilistic Constellation Shaping for Optical Fiber Communications"; Journal of Lightwave Technology, vol. 37, No. 6, Mar. 15, 2019.
Patrick Iannone et al "Increasing Cable Bandwidth Through Probabilistic Constellation Shaping"; SCTE•ISBE Atlanta. GA, Oct. 22-25, 2018.
Nokia Bell Labs "Probabilistic Constellation Shaping: Challenges and Opportunities for Forward Error Correction"; OFC 2018 Optical Society of America.
Hasitha Jayatilleka et al "Photoconductive heaters enable control of large-scale silicon photonic ring resonator circuits"; vol. 6, No. 1 / Jan. 2019 / Optica.
Xuezhe Zheng et al "A high-speed, tunable silicon photonic ring modulator integrated with ultra-efficient active wavelength control"; May 19, 2014 | vol. 22, No. 10, Optics Express 12628.
Po Dong, et al "Simultaneous wavelength locking of microring modulator array with a single monitoring signal"; vol. 25, No. 14 | Jul. 10, 2017 | Optics Express 16040.
Akhilesh S. P. Khope et al "Multi-wavelength selective crossbar switch"; vol. 27, No. 4 | Feb. 18, 2019 | Optics Express 5203.
Y.C. Gültekin et al "On Constellation Shaping for Short Block Lengths"; WIC 2018.
Ammar Karkar et al "A Survey of Emerging Interconnects for On-Chip Efficient Multicast and Broadcast in Many-Cores"; Feb. 12, 2016, IEEE circuits and systems magazine.
Christos A. Thraskias et al "Survey of Photonic and Plasmonic Interconnect Technologies for Intra-Datacenter and High-Performance Computing Communications"; IEEE Communications Surveys & Tutorials, vol. 20, No. 4, Fourth Quarter 2018.
Kim Roberts et al "Beyond 100 Gb/s: Capacity, Flexibility, and Network Optimization"; C12 J. Opt. Commun. Netw./vol. 9, No. 4/Apr. 2017.
Marc De Cea et al "Power handling of silicon microring modulators"; vol. 27, No. 17 / Aug. 19, 2019 / Optics Express 24274.

* cited by examiner

*Primary Examiner* — Michael Stahl

(57) ABSTRACT

An aspect of the disclosure provides an optical device including a microring resonator (MRR).

20 Claims, 5 Drawing Sheets

OPTICAL DEVICE

FIELD OF THE INVENTION

The present invention pertains to the field of communication networks, and in particular to Photonic Integrated Circuits (PIC) technologies, such as silicon photonics.

BACKGROUND

Optical switches and tunable optical filters are valuable elements in modern photonic networks. For example, reconfigurable Wavelength Division Multiplexed (WDM) optical networks, including Metro networks, Passive Optical Networks (PON), and high performance computing, make use of different wavelengths of light for various purposes. As such, many optical/photonic networks need devices that allow the selection of a wavelength to be added to or dropped from the transport link.

Photonic Integrated Circuits (PICs), utilizing, for example, Silicon-on-Insulator (SOI) technologies, can provide high speed switching and a small footprint. Silicon-on-Insulator (SOI) is a promising technology for developing optical switches due to its relatively large thermo-optic coefficient, high thermal conductivity and high contrast refractive index. In recent years, various thermo-optic switch configurations have been reported on the SOI platforms. PICs can also be used for many short-haul applications such as in large scale data centers (DC) and high performance computing (HPC) systems For all of these systems, there is a growing requirement for systems with faster and more reliable switching, resulting in a move towards optical cross connect technologies being applied both to connect data centers and to connect groups of servers within data centers.

Interconnect technology has evolved from 10 Gbps to 200 Gbps and 400 Gbps standards in IEEE 802.3, with higher speeds expected for future generations of standard and technologies. As such, various schemes and architectures have been proposed to meet the requirements of high density, small footprint, reduced power consumption as well as support for scalability. Such technologies are needed to support operations under un-cooled environment (typically from 20° C. to 70° C.) which makes the reliability, power consumption and footprint even more challenging.

Micro-Ring Resonators (MRRs), also known as Microrings, are a known photonic element that can be implemented in a PIC. PIC-implemented MRRs have been considered for use in a number of different applications, including filters (such as add-drop filters as may be used in a reconfigurable optical add-drop multiplexer (ROADM)), and switches. A microring is a waveguide loop that is optically coupled to one or two transport waveguides.

MRRs implemented in PIC can be small in size, efficient in power consumption and support high data. They also support easy scalability for WDM architectures where terabits of data is carried on a single strand of fiber.

While MRRs address most requirements for interconnect technologies, they also impose some technical challenges. Among these challenges, is a thermal management and control problem. An MRR is designed to allow for coupling of light at a given wavelength. However, changes in operational parameters, including input laser power, changes in an operating temperature, and other such factors can cause a drift in the resonant wavelength of the MRR. Assuming that the laser input remains constant, changes in the operational parameters will result in a shift away from the wavelength that the MRR was designed to couple. One controllable operational parameter is the operating temperature of the MRR. A controller can be used to increase or decrease an operating temperature of the MRR through controlling the application of heating (e.g. through the use of a resistive heater disposed proximate to the MRR). In other words, a heating element can be controlled to heat the MRR to maintain an operational temperature so that the resonance of the MRR to the desired wavelength is maintained. A feedback control loop can be used to control the amount of heat applied. In other embodiments it may be possible to use an open loop control system in place of the feedback control loop. Although other external factors, including aging of the MRR, may contribute to the slow drift of the MRR resonance, control systems tend to focus on the control of the temperature as adjusting the temperature is more practical than controlling the wavelength of a laser source, adjusting a DC bias of various components or otherwise counteracting the effects of circuit aging.

Accordingly, there is a need for a system and method that at least partially addresses one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

In accordance with an aspect of the present invention, there is provided a short-haul optical transmitter. The transmitter comprises a distribution matcher, a micro-ring resonator and a controller. The distribution matcher (DM) receives data for transmission, from a data source at a data rate, and generates a ring input data stream. The micro-ring resonator (MRR) receives the ring input data stream, and modulates a laser in accordance with the ring input data onto a laser. The modulated laser is then transmitted by the MRR towards a destination. The controller operates at a rate independent of the data rate for controlling an operating temperature of the MRR in accordance with at least one of data associated with the laser input to the MRR and data associated with the modulated laser transmitted by the MRR.

In an embodiment of the first aspect, the ring input data stream has a data rate different than the data rate of the data source. In another embodiment, the transmitter further comprises a detector operatively connected to an output of the MRR for obtaining data associated with the modulated laser transmitted by the MRR, and for providing the obtained data to the MRR controller, and optionally, detector operates at rate independent of the data rate of the data source. In another embodiment, the MRR comprises an input for receiving from an external source the laser and wherein the transmitter comprises a detector operatively connected to the input of the MRR for obtaining data associated with the laser received by the MRR and for providing the obtained data to the MRR controller. In a further embodiment, the data rate of the data source is on the order of tens of gigabits per second, and the MRR controller operates at a rate on the order of kilohertz. In a further embodiment, the laser has a wavelength of $\lambda_1$ and the MRR has a resonant wavelength set in accordance with $\lambda_1$, and optionally the MRR controller controls the operating temperature of the MRR to maintain a resonant wavelength set in accordance with $\lambda_1$.

In accordance with a second aspect of the present invention, there is provided a data center switching systems having a card from which a distribution matching is applied to a data stream before optical transmission to a switch. The distribution matched optical signal is switched to one of a plurality of outputs through the use of a ring resonator switch. Each MRR in the ring resonator switch is controlled by a switching controller that adjusts the temperature of the MRR at a rate independent of the data rate of the data stream using a similar setup to that described above.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
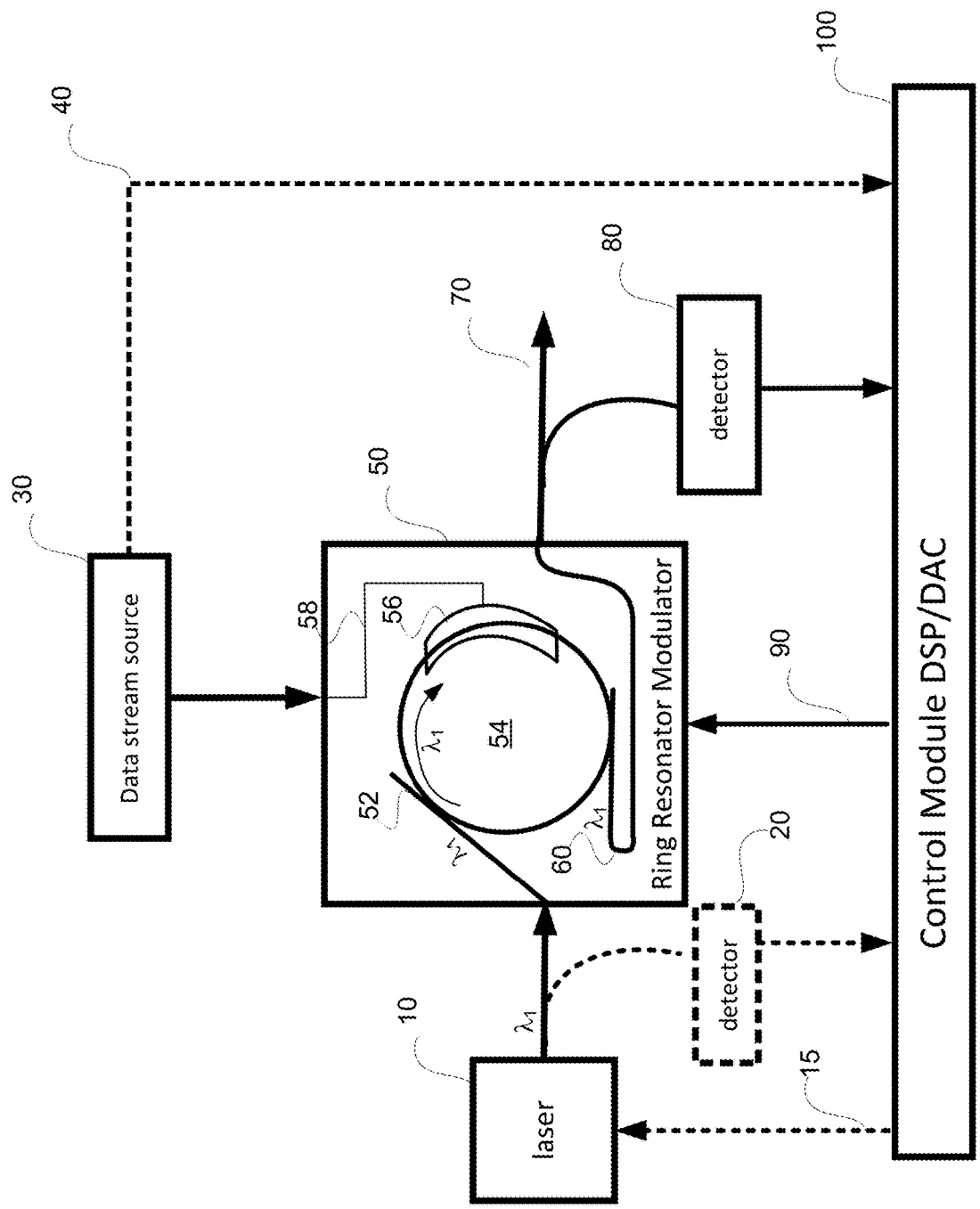
FIG. 1 schematically illustrates an optical transmitter having a feedback loop for controlling a ring resonator module.

As noted above, an MRR is ring shaped an optical waveguide ring that is optically coupled to another optical waveguide to allow a signal at a resonant wavelength to be moved from the other optical waveguide into the ring. Those skilled in the art will appreciate that although discussed herein as being circular, an MRR can be any of a number of different shapes, including ovals and so-called racetrack shapes (circular end segments connected by straight paths FIG. 1 schematically illustrates a short-haul optical transmitter module for modulating a data stream from data stream source 30 onto a laser of wavelength $\lambda_1$ provided by laser 10 using Ring Resonator Modulator 50.

The ring resonator modulator 50 receives the laser of wavelength $\lambda_1$ where it is transported on input waveguide 52. MRR 54 is coupled to waveguide 52 so that at the correct operational temperatures it will in-couple wavelength $\lambda_1$ into the ring 54. It will be understood that the resonant wavelength of MRR 54 is often set to be slightly larger than $\lambda_1$. This allows for a more stable operation of the MRR 54. Modulation of the input laser signal can be performed using an electro-magnetic coupler 56 which is driven in accordance with the digital input signal 58 representative of the data stream from source 30. It should be understood that any of a number of different interfaces could be used in place of a coupler to satisfy different design considerations. The modulator 50 also includes electrodes (not shown) for controlling a heater which heats the MRR for keeping the operating resonant wavelength of the MRR set in accordance with the transmission wavelength. Accordingly, the ring resonator modulator 50 includes an input interface for receiving a drive signal 90 for driving the electrodes. The drive signal 90 is a control signal from a control module 100. Control Module 100 may be implemented in a Digital Signal Processor (DSP) coupled to a Digital to Analog Convertor (DAC) or in another suitable processing platform. By controlling the heating elements controller 100 can shift the resonant wavelength of the ring 54 when it drifts.

The control module 100 determines is control of the heating of MRR 54 in accordance with information received from detector 80, which monitors the output 70 of the ring resonator modulator 50, the optional detector 20 which monitors the output of laser 10, and signal 40 which is representative of the data stream from data stream source 30. These inputs are used, in conjunction with a model of the behavior of MRR 54, to generate a control signal output 90 which is used to control the heating elements. It should be understood that in some embodiments, a secondary control signal 15 can be used to communicate with laser 10 if laser 10 is controllable by external entities.

The control module 100 generates a control signal 90 to mitigate the effect of drifts in the resonant wavelength of the MRR 54. By mitigating the effects of drifts through the heating of MRR 54, the resonant wavelength of MRR 54 is maintained and continues to be set in accordance with the transmission wavelength Drift caused by many of the operating conditions discussed above, is slow in comparison to the data rate of the data stream from data stream source 30.

Some of the temperature changes in the MRR 54 are a result of a self heating phenomenon that is associated with the laser power and the speed of the modulation, which is a function of the data rate. In operation the laser 10 provides a power at wavelength $\lambda_1$. This energy is coupled in to the ring. When modulating data stream 58 onto the wavelength some of the power of the signal at wavelength $\lambda_1$ has to be attenuated. This energy is converted to heat inside the ring. If, in a given time period, there are more 1s than 0s, or vice versa, there can be unexpected variation in the heating profile of MRR 54. To address this, it is possible to use data from the data stream source 30 to allow controller 100 to understand the distribution of values in the data stream. This can allow controller 100 to generate control signal 90 to compensate for the MRR experiencing drift based on a self-heating effect. It should be understood that in order to compensate for the self heating caused by the distribution of the data stream, the controller must operate at a rate equivalent to the data rate of the data stream. As the data stream typically is on the order of 50 Gb/s, this requires a high power processor which increases the cost of the transmitter. The increase in complexity and cost to mitigate the self heating associated with the distribution of values in the data stream has served as an impediment to the commercial implementation of such embodiments.

More details of the self-heating problem will now be discussed. The self-heating problem can be formulated using the following equation (assuming two transmission levels), for a MRR modulating a data stream:

$$P_{self-heat} = \gamma \Delta P \frac{N_0}{N}. \qquad \text{EQ 1}$$

Where:

$P_{self-heat}$ refers to the self-heating power dissipated inside the ring normalized to N bits of information.

gamma (γ) Constant factor depending on design, fabrication technology etc,

ΔP is the power difference between the "ON" and "OFF" states of the MRR modulator, or simply the optical modulation amplitude (OMA) metric of the MRR, and $N_O/N$ is the ratio of "OFF" and "ON" determined for a block length of N bits of the data stream. Accordingly, $N_O/N$ is dependent on how many zeros are present in the data stream block length of N. It is noted that while this equation is for non-return to zero (NRZ) modulation schemes in which there are only two modulation level exists, for other modulation schemes (eg pulse-amplitude modulations PAM-4) have similar equations can be derived.

This equation illustrates that variations in the distribution of values in the data stream (and more specifically, the ratio of on/offs, or ones to zeroes in the data bit stream) will affect the power variations (and therefore the degree of self-heating). In particular, it is noted that strings of zero bits can produce significant increases in the power that must be dissipated. Simulations have shown that random bit patterns (from client data) can create significant power variations for a block of 64 bits. Furthermore, as strings of zero bits can occur in typical client data, there exists a need for self-heating control and compensation. This need increases with increased transmission power. Accordingly, based on simulations, the self-heating effect on MRRs increase with the transmission power for optical systems. An imbalanced data stream with a high data rate makes the situation worse.

Accordingly, embodiments of the invention include methods and systems for encoding a data stream (i.e., data which will be modulated onto the laser within the ring) so as to reduce, or minimize the power fluctuations caused by variances in the client data. Accordingly, a reversible digital encoding scheme is applied to the data, to produce an encoded data stream which will reduce power fluctuations in the ring in comparison to the raw (un-encoded) data.

Figure 2:
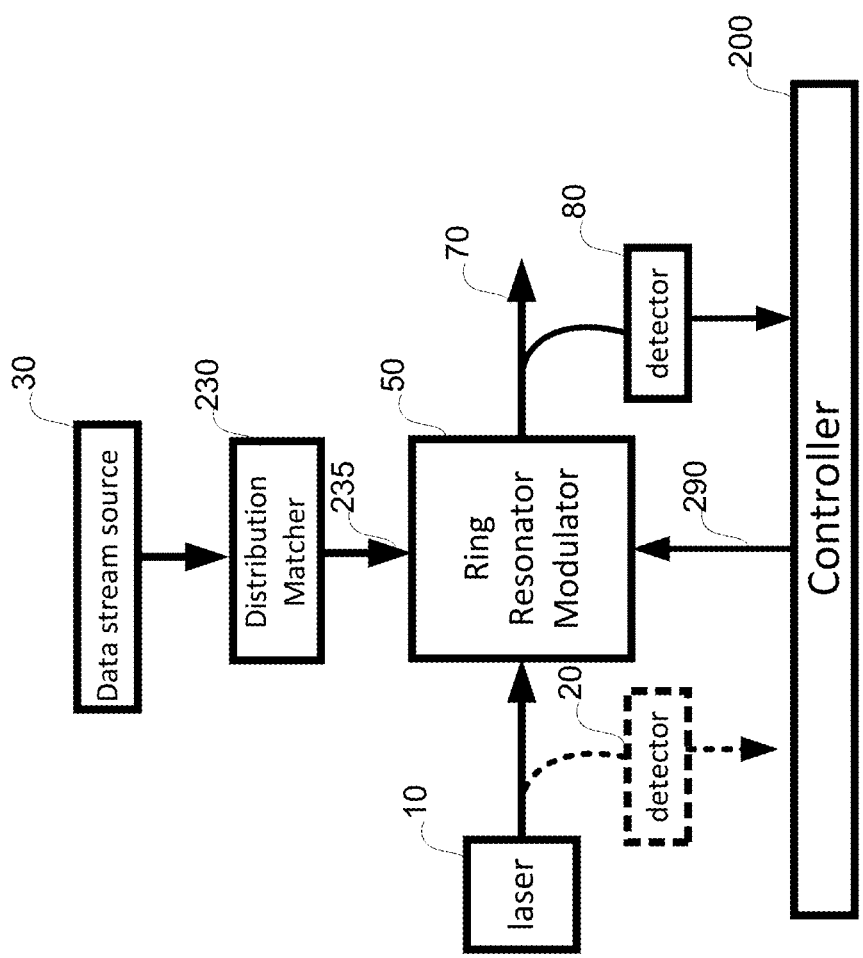
FIG. 2 schematically illustrates an optical transmitter configured for adjusting the heating of an MRR, in accordance with embodiments of the present invention.

By mitigating the self-heating effects caused by imbalanced distribution of values in the data stream, a controller that operates at a rate independent of the data rate can be deployed. In the embodiment of FIG. 2, a distribution matcher 230 receives data from a data source at a data rate. The DM 230 encodes the received data stream from data stream source 30. This encoded data stream has a more balanced distribution of values in a given block length, allowing for the self-heating phenomenon to be modelled. The encoded data stream serves as the input to the MRR, and may be referred to as a ring input data stream. The data rate of the ring input data stream does not necessarily match the data rate of the data stream.

The physical specifications of the MRR can be considered in the selection of a code or family of codes to be applied by this distribution matcher. In some embodiments, the proper selection of a code may allow for a minimized rate loss while maintaining a stable power over a block length of bits (determined by the physical time constant of the self-heating effects).

Accordingly embodiments utilize a distribution matcher in the transmitter for applying a distribution matching encoding scheme to the data to reduce self-heating effect. A reverse encoding scheme is then applied to the received data at the receiver to recover the original data. It is noted that various distribution matching (DM) encoding schemes can be used. Pattern dependency can be fully eliminated by employing a suitable distribution matcher to guarantee a fixed ratio (relative number of "0" and "1"s in a fixed block length) bit pattern. However, selecting a particular DM code typically represents a trade-off between pattern dependency and rate loss.

Table 1 illustrates an example of digital encoding impact of the self-heating power variations vs rate loss for known DM encoding schemes, for. OMA=1:

TABLE 1

Illustration of digital encoding impact of the self-heating power variations vs rate loss

| Coding Scheme | Pattern Length = 64 Normalized Self-Heating Variations [(max-min) × 100] | Pattern Length = 512 Normalized Self-Heating Variations [(max-min) × 100] | Bit Rate Loss [%] |
|---|---|---|---|
| None [Client i.i.d Pattern] | 53 | 19 | 0 |
| 8B/10B Coding Scheme | 6.25 | 1 | 20 |
| Manchester Coding | 0 | 0 | 100 |

As can be seen, Manchester coding has the best results where the self-heating power becomes nearly constant over 512 bits. However this comes at the cost of rate loss.

Several known DM schemes have been developed for different applications. For example, known DM encoding schemes, such as Constant composition distribution matching (CCDM), and enumerative sphere shaping (ESS) have been successfully used in metro and long haul applications in coherent engines as a method to perform Probabilistic constellation shaping (PCS) to improve spectral efficiency. It should be understood that DM codes developed for a different purpose may not provide the desired results in reducing the self-heating, while other previously developed DM codes may provide acceptable results.

FIG. 2 schematically illustrates an optical transmitter configured for adjusting for MRR self-heating, in accordance with embodiments of the present invention. In FIG. 2, elements with the same number are functionally similar to those of FIG. 1. The embodiment in illustrated in FIG. 2 includes a DM 230 for applying a DM encoding to the data stream output by data stream source 30. The DM encoded data stream 235 has a smoothed power variation over a block of M bits, to reduce the self-heating that occurs in the MRR of ring resonator modulator 50. The DM encoded data stream 235 may also be referred to as a ring input data stream as it serves as the input to the ring resonator modulator 50. Although not illustrated, Ring Resonator Modulator 50 may contain input waveguide 52, MRR 54, coupler 58, data stream 58 and output waveguide 60 as illustrated in FIG. 1. In the embodiment of FIG. 2, data stream 58 is representative of the distribution matched data stream 235. Controller 200 can be implemented without using data from the data stream source 30 as a control input. This allows the rate at which controller 200 operates to be independent of the data stream. While illustrated as having an optional input from a detector 20 representative of the characteristics of the output of laser 10, and an input from a detector 80 representative of characteristics of the output of Ring Resonator Modulator 50, it should be understood that controller 200 can be implemented using either one or both of these inputs. The use of the output of detector 80 allows for closed loop control, while the use of only the output of detector 20 would allow for open loop control. Detectors 20 and 80 may not operate at line rate, and instead may operate at the same rate as controller 200. Controller 200 can generate control signal 290 which is used to control heating of the ring resonator modulator 50. Because highly variable aspects of self-heating have been mitigated through the use of distribution matching, controller 200 can operate at a much lower rate. The rate at which controller 200 operates is independent of the data rate of the stream provided by data stream 30, or even the output 235 of distribution matcher 230. Controller 200 only needs to compensator for more slowly varying, long term drift fluctuations of the MRR, without needing to compensate for faster fluctuations dependant on self-heating based on the data stream. The rate at which controller 200 needs to operate to compensate for the slow drift is, in some embodiments, in the range of KHz despite an input data rate on the order of 50 Gb/s according to some embodiments. It should be understood that controller 200 may also be referred to as an MRR controller as it serves to control the tuning of the MRR.

Figure 3:
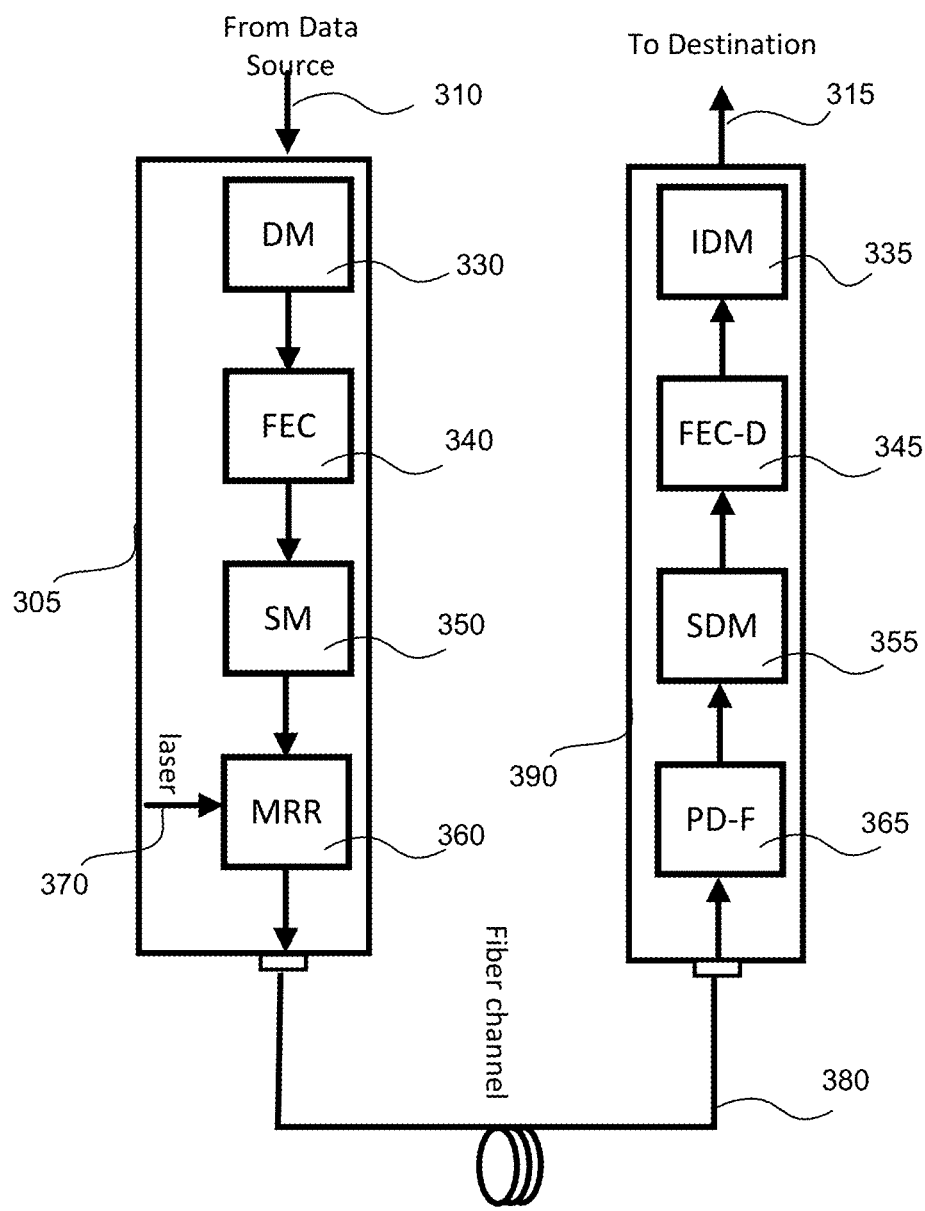
FIG. 3 schematically illustrates an optical transmission system including a transmitter and receiver configured to adjusting heating levels of an MRR in accordance with a distribution matched data source, in accordance with embodiments of the present invention

Because the transmitted data is DM encoded, an inverse DM operation is required at a receiver to retrieve the un-encoded data stream. An example transmission system for a single channel (wavelength) is illustrated in FIG. 3. In FIG. 3, a transmitter 305 receives data 310. This data is distribution matched and encoded for transmission to receiver 390 via an optical transmission channel such as fiber channel 380. Transmitter 305 and receiver 390 can each be implemented on a PIC. If a single node has both a transmitter and receiver, they can both be implemented on a single PIC. Transmitter 305 is shown to include DM 330, which may be implemented in a DSP, and which applies a distribution matching encoding to the data 310. A DSP may be implemented on the same physical substrate as the PIC. The DM encoded data stream is further encoded by a forward error encoding (FEC) module 340 and a symbol mapper (SM) 350. Thus the DM and FEC encoded data is mapped onto symbols according to a modulation format (e.g., NRZ, PAM-4, QAM etc) by SM 350. The symbols generated by SM 350 are then modulated onto laser signal 370 by MRR 360 for transmission via fiber 380. While not shown it should be appreciated that the transmitter 305 can also include the feedback control loop and control module of FIG. 2. It is noted that transmitter 305 can also be referred to as a MRR modulator.

The receiver 390 includes photodetector/filter PD-F 365 for filtering and detecting the received optical signal from optical fiber 380. Signal de-mapper (SDM) 355 then demaps the symbols for FEC decoding by FEC-D module 345. Inverse DM is performed by the IDM module 335 to recreate the data 315 which is sent to the destination. It is noted that the IDM module 335 is configured to use an inverse distribution matching decoding scheme which inverts or reverses, the DM encoding scheme used by the DM module 330. In other words, IDM 335 is configured with an inverse distribution matching decoding dependent on the DM encoding scheme utilized by DM module 330. The receiver 390 can be implemented as a PIC, and the IDM module can be implemented within a DSP.

In some embodiments for a WDM architecture each MRR modulator has its own DM module to map client bits to the desired distributions for minimized self-heating effects. Note that the location of the DM 330 is illustrated in FIG. 3 to be followed by the FEC module. However, in other embodiments, the DM 330 can be located anywhere before MRR at the TX and the IDM 335 can be located anywhere after detector 365 in the receiver 390. Further in some embodiments, the FEC modules may be optional, for example for short distance transmitters.

Examples of DM implementation will now be discussed, accordance with embodiments of the invention. The distribution matching coding implemented by the DM can be selected to manipulate the distribution of the bit patterns of the data stream in order to minimize the self-heating effects.

As discussed above with respect to table 1, while Manchester coding (in the 512 bit block example) produced almost no self-heating, it does so at the cost of an increased rate loss. In a number of embodiments, it may better to find a DM coding scheme that is a trade-off between self-heating and rate loss.

Figure 4:
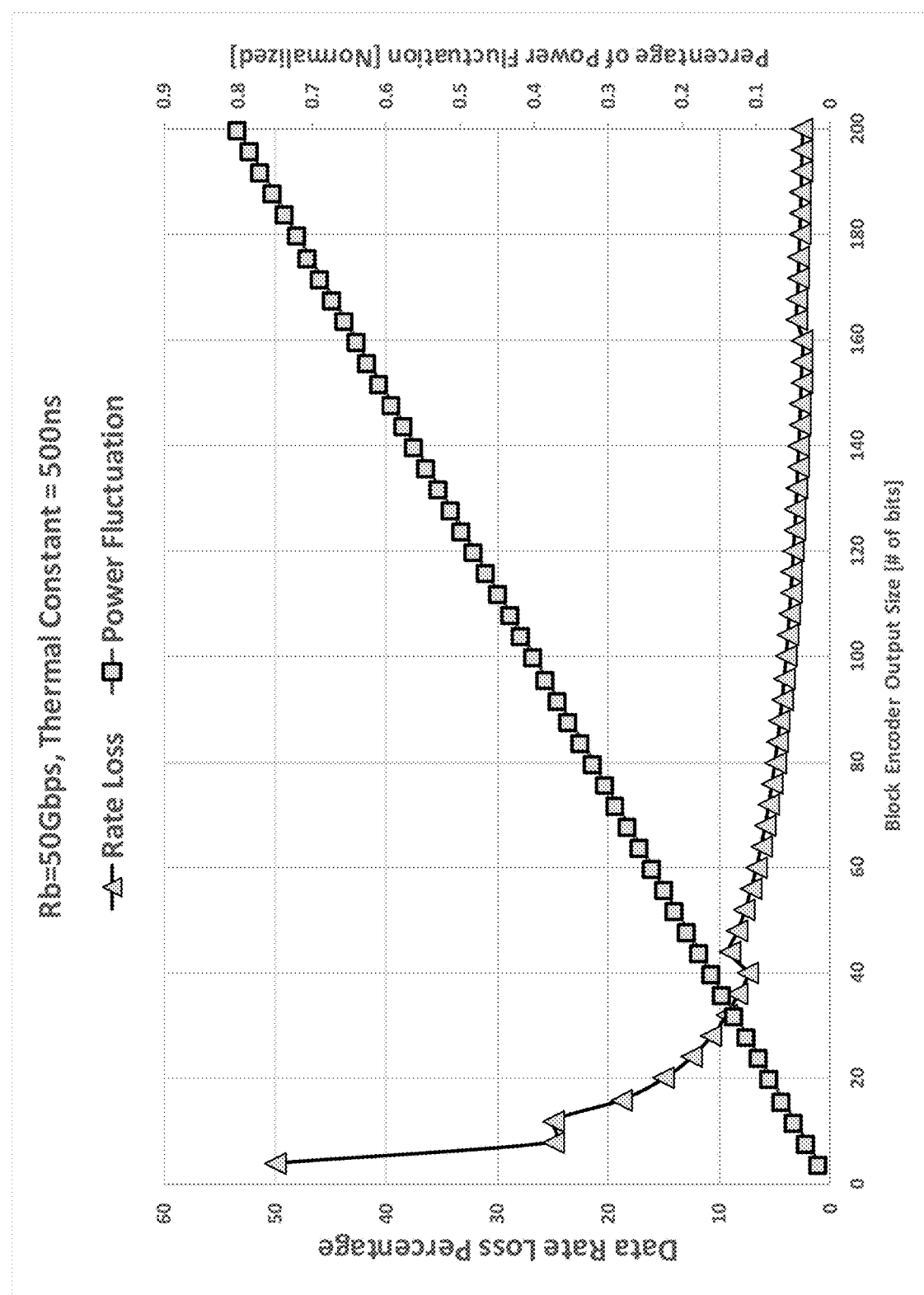
FIG. 4 is a graph illustrating a relationship between both rate loss and power fluctuation in relation to output block size according to simulations performed in accordance with embodiments of the present invention.

FIG. 4 plots the trade-off for distribution matcher (DM) using simulations for existing CCDM codes for various bit block length assuming that "0" and "1" have equal number of appearance for each block length and the input data to the distribution matcher is pure random data from client (also referred as i.i.d: identically-independently distributed).

Introducing distribution matching may cause some rate loss. Mostly the output length of DM (here CCDM) is longer than input length and hence there will be rate loss (as indicated, with the amount of rate loss shown on the left axis). On the other hand using the distribution matcher limits the statistics for the desired block length. Because the number of "0" and "1" in a data block of a given size are kept constant (and equal in this simulation) the variations of average power (for 500 ns window in this simulation) will linearly increase as the DM output/input block length increases (as indicated with the amount of power fluctuations shown on the right y-axis).

FIG. 4 illustrates that there is a trade-off between the rate loss and the power fluctuations for the desired time window (here 500 ns). The desired operation of the DM block depends on the micro-ring design and fabrication, and complexity of the DM used. For instance if the power fluctuations below 0.2% is acceptable, the graph shows that a maximum block length of 50 can be used which impose ~8% of rate reduction.

It is noted that the simulation providing the results illustrated in FIG. 4 is basic, and did not consider other impacts of the system such as distribution gain, allowing for further rate improvement to be achieved by more optimizations on the DM scheme. Further, the DM encoding can be customized for better constellation gains etc. Further, the desired optimal operation will vary depending on the ring thermal constant (here 500 ns) and data rate.

Other families of DM encoding may exhibit better trade-offs.

Accordingly one design parameter is an optimal length of M where the variations given by equation (1) are minimized over any block length of N. The rate loss discussed above is a function of M, while the self heating power fluctuation is related to N and physical properties of the MRR.

Accordingly, the physical specifications of the MRR can be accounted for in the search for a family of codes that achieves an acceptably low rate loss while maintaining an acceptably stable power over a given block length (determined by the physical time constant of EQ 1). Embodiments utilize a desired DSP distribution matching encoding scheme for a code length of M≤N that supports the minimal rate loss and minimal power fluctuations over sliding window of N bits. DM 230 of FIG. 2 could thus be configured to balance the ratio of bits in a block, while DM 330 of FIG. 3 can be configured to balance the ratio of symbols in a desired block length M and hence minimizing the power fluctuations over N.

For instance for a MRR design with self-heating time constant of 10 ns and modulation rate of 50 Gbps, the value of N may be selected to produce minimal power changes in the N bits. In this example, N≤50 Gbps*10 ns=500. Accordingly, selecting N=100 gives an average a power variation of ⅕ compared to the power variation when N=500 is selected. Thus selecting N=100 for example then produces minimal power changes within N bits and then outside of self-heating bandwidth (not seen by the MRR self-heating physical filters). As stated, the MRR structures discussed with respect to the various embodiments above can be integrated into various systems including a various forms of transmitters and optical switches. The MRR modulator structure discussed herein can be modulation, baud-rate and technology agnostic, and hence can be implemented in a variety of different optical systems which require MRR modulators to operate at high optical powers The MRR modulators discussed above included the DM as part of a single PIC (e.g., the distribution matcher 330 was illustrated as part of the transmitter 305, and the de-mapper (IDM 335) was illustrated as part of the receiver 390. However, in other embodiments, the DM/IDM can be part of a system outside of the transceiver. For example, the data stream can be subject to distribution matching and the DM encoded data is then sent to a MRR transmitter module. One such example is for a switch architecture illustrated for a data center in FIG. 5, according to embodiments of the present invention.

Figure 5:
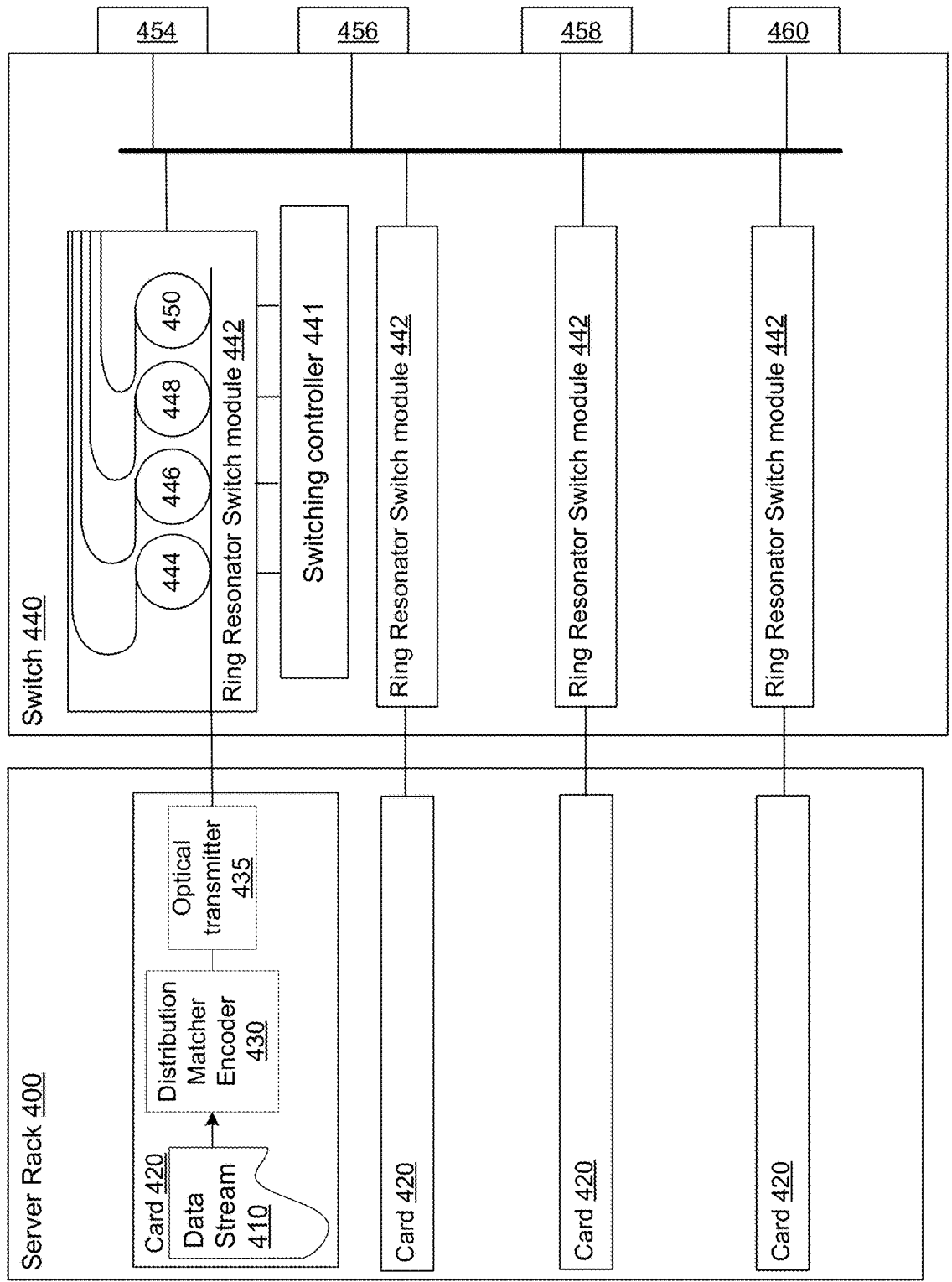
FIG. 5 illustrates the use of distribution matching in an MRR-based optical switch.

FIG. 5 illustrates the application of the distribution matching to a data stream in a data center environment. In data centers, there are a plurality of servers typically arranged in a server rack 400. Each server makes use of at least one line card 420 for connecting to a switch 440. Although individual servers are not shown, it should be understood that each line card 420 is connected to a server, and multiple line cards 420 may be connected to a single server.

Each line card 420 can represent a data source generating a data stream 410. The stream 410 is sent to a switch which will direct the stream to another line card 420, which may be in the same or a different server rack. Switches can be used to inter connect servers in the same rack (often referred to as a Top of Rack (TOR) switch), they can be used to interconnect different racks of servers. In such an embodiment, each TOR would be represented by one or more line cards, each of which is connected to a switch. In some embodiments, each server is connected to a single switch, creating a very flat topology. IN other embodiments, servers are connected to a TOR switch, and TOR switches are connected to a higher level switch in a hierarchical topology.

In the illustrated embodiment of FIG. 4, each card has a DM encoder 430 for performing a distribution matching encoding of the data stream 410. The output of the DM encoder 430 is optically encoded and transmitted by optical transmitter 435. One skilled in the art will appreciate that the functions illustrated in FIG. 3 may be present in this chain between DM encoder 430 and transmitter 435. The output of optical transmitter 435 is assumed to be at wavelength λ1.

MRR based switch 440 is illustrated here as a 4×4 switch, that is, it has 4 input and 4 outputs. This is simply for the sake of this example and the expediency of rendering a drawing. Other switch sizes and configurations can be employed. For each input of switch 440 there is a ring resonator switch module 442. The switch module 442 receives the transmitted signal at wavelength λ1, and has a number of MRRs, equivalent to the number of the switch outputs. Thus, in the illustrated embodiment of a 4×4 switch, switch module 442 has 4 MRRs 444, 446, 448 and 450. Each of these MRRs has a resonant wavelength set in accordance to λ1.

The operation of the MRRs is governed by switching controller 441 which can select which of the MRRs should in-couple the signal at wavelength λ1. For example, if the first output port 454 of switch 440 should be outputting the received signal, then MRR 444 will in couple the signal. If it should be the second output port 456, then MRR 446 will in couple the signal. If it should be the third output port 458 then MRR 448 will in couple the signal. If it should be the fourth output port 460 then MRR 450 will in couple the signal.

Switching controller 441 can effect such a selection of the available MRRs in a number of ways, including controlling the power provided to the each MRR, or the power provided to amplifiers associated with each of the rings. The switching controller can also adjust the heating provided to each of the MRRs so that only one of the MRRs is tuned to a resonant wavelength that will allow for in-coupling of light at wavelength λ1.

Switching controller 441 is illustrated as being connected to the first ring resonator switch module 442, but those skilled in the art will appreciate that it can be connected to all of the switch modules 442 to allow the mapping of the input to the output ports.

Switching controller 441 can also use as an input the input signals and the outputs of each of the MRRs. These inputs can operate at a lower rate than the line rate, and allow for the same slow control of the resonance drift as discussed in FIG. 2. Those skilled in the art will appreciate that it may be possible to implement two different controllers in place of switching controller 441, one of which is focused on switch control, and another that is directed to controlling MRR heaters at a lower operational rate as illustrated in FIG. 2.

Logic within switch controller 441 can act to ensure that only one input is directed to a given output as will be understood by those skilled in the art. As mentioned above, the use of DM encoder 430 means that the receiving node (connected to the output of switch 440) will have to do a DM decoding operation before fully decoding the transmitted data stream.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

We claim:

1. A short-haul optical transmitter comprising:
   a distribution matcher (DM), for receiving data for transmission, from a data source at a data rate, and for generating a ring input data stream;
   a micro-ring resonator (MRR) for receiving the ring input data stream, for modulating the ring input data onto a laser signal and for transmitting the modulated laser signal towards a destination; and
   an MRR controller operating at a rate independent of the data rate for controlling an operational parameter of the MRR in accordance with at least one of data associated with the laser signal input to the MRR and data associated with the modulated laser signal transmitted by the MRR;
   wherein the MRR comprises an input for receiving from an external source the laser signal and wherein the transmitter comprises a detector operatively connected to the input of the MRR for obtaining data associated with the laser signal received by the MRR and for providing the obtained data to the MRR controller.

2. The short-haul optical transmitter of claim 1 wherein the ring input data stream has a data rate different than the data rate of the data source.

3. The short-haul optical transmitter of claim 1 further comprising a detector operatively connected to an output of the MRR for obtaining data associated with the modulated laser signal transmitted by the MRR, and for providing the obtained data to the MRR controller.

4. The short-haul optical transmitter of claim 3 wherein the detector operates at rate independent of the data rate of the data source.

5. The short-haul optical transmitter of claim 1 wherein the data rate of the data source is at least ten of gigabits per second, and the MRR controller operates at a rate of at least one kilohertz.

6. The short-haul optical transmitter of claim 1 wherein the laser signal has a wavelength of λ1 and the MRR has a resonant wavelength set in accordance with λ1.

7. The short-haul optical transmitter of claim 6 wherein the MRR controller controls the operational parameter of the MRR to maintain a resonant wavelength set in accordance with λ1.

8. The short-haul optical transmitter of claim 1 wherein the DM is configured with an encoding scheme to manipulate the distribution of the bit patterns of the data stream to minimize self-heating effects.

9. The short-haul optical transmitter of claim 1 wherein the DM is configured with an encoding scheme of length M to minimize self-heating effects over a block length of N bits of information dependent on the physical time constant of the MRR.

10. The short-haul optical transmitter of claim 9 wherein the DM is configured with an encoding scheme of M less than N to reduce the self-heating power dissipated inside the ring normalized to N bits of information dependent on the characteristics of the MRR and the modulation scheme employed.

11. The short-haul optical transmitter of claim 1 wherein the operational parameter is temperature.

12. The short-haul optical transmitter of claim 1 wherein the operational parameter is dc bias.

13. A method of optical short-haul data transmission comprising:
receiving, at a distribution matcher (DM), data from a data source at a data rate;
generating, by the DM, a data stream for input to a micro-ring resonator (MRR);
receiving, by the MRR, a laser signal at an input from an external source;
obtaining, by a detector operatively connected to the input of the MRR, data associated with the laser signal received by the MRR;
providing, by the detector, the obtained data to an MRR controller;
receiving, by the MRR, the data stream and modulating, by the MRR, the data stream onto the laser signal;
transmitting, by the MRR, the modulated laser signal towards a destination; and
controlling, by the MRR controller, an operational parameter of the MRR in accordance with at least one of data associated with the laser signal input to the MRR and data associated with the modulated laser signal transmitted by the MRR;
wherein the MRR controller operates at a rate independent of the data rate.

14. The method of claim 13 wherein the ring input data stream has a data rate different than the data rate of the data source.

15. The method of claim 13 wherein the DM is configured with an encoding scheme to manipulate the distribution of the bit patterns of the data stream to minimize self-heating effects.

16. The method of claim 13 wherein the DM is configured with an encoding scheme of length M to minimize self-heating power dissipated over a block length of N bits of information dependent on the physical time constant of the MRR.

17. The method of claim 16 wherein the DM is configured with an encoding scheme of M less than N to reduce the self-heating power dissipated inside the ring normalized to N bits of information dependent on the characteristics of the MRR and the modulation scheme employed.

18. The method of claim 13 wherein the operational parameter is temperature.

19. The method of claim 13 wherein the operational parameter is dc bias.

20. The method of claim 13 further comprising receiving, by an output detector operatively connected to an output of the MRR data associated with the modulated laser signal transmitted by the MRR, and providing the obtained data to the MRR controller, wherein the output detector operates at rate independent of the data rate of the data source.

* * * * *

UNITED STATES PATENT AND TRADEMARK OFFICE
CERTIFICATE OF CORRECTION

| | |
|---|---|
| PATENT NO. | : 11,119,342 B2 |
| APPLICATION NO. | : 16/791774 |
| DATED | : September 14, 2021 |
| INVENTOR(S) | : Mohammad Mehdi Mansouri Rad and Hamid Ebrahimzad |

It is certified that error appears in the above-identified patent and that said Letters Patent is hereby corrected as shown below:

In the Specification

Column 4, Line 27, "transmission wavelength Drift caused by many of the oper-" should be --transmission wavelength $\lambda_1$. Drift caused by many of the oper- --

Column 4, Line 36, "ring. When modulating data stream 58 onto the wavelength" should be --ring. When modulating data stream 58 onto the wavelength $\lambda_1$,--

Signed and Sealed this
Ninth Day of November, 2021

Drew Hirshfeld
*Performing the Functions and Duties of the
Under Secretary of Commerce for Intellectual Property and
Director of the United States Patent and Trademark Office*